US012614431B2

(12) United States Patent
McGrath et al.

(10) Patent No.: US 12,614,431 B2
(45) Date of Patent: Apr. 28, 2026

(54) CASH TRAP DETECTION

(71) Applicant: NCR Atleos Corporation, Atlanta, GA (US)

(72) Inventors: Shannon Louise McGrath, Perth (GB); Alexander William Whytock, Perthshire (GB); Barry James Allen, Dundee (GB); Dyllon Charles William Dodds, Angus (GB); Conor Michael Fyfe, Carnoustie (GB); Greg Robert Harrison, Angus (GB); Scott Low Colston, Dundee (GB); Gary Alexander Ross, Midlothian (GB)

(73) Assignee: NCR Atleos Corporation, Atlanta, GA (US)

(*) Notice: Subject to any disclaimer, the term of this patent is extended or adjusted under 35 U.S.C. 154(b) by 8 days.

(21) Appl. No.: 18/373,503

(22) Filed: Sep. 27, 2023

(65) Prior Publication Data

US 2025/0104537 A1 Mar. 27, 2025

(51) Int. Cl.
*G07F 19/00* (2006.01)

(52) U.S. Cl.
CPC .......... *G07F 19/209* (2013.01); *G07F 19/203* (2013.01); *G07F 19/211* (2013.01)

(58) Field of Classification Search
CPC ..... G07D 11/40; G07D 13/00; G07D 2211/00
See application file for complete search history.

(56) References Cited

U.S. PATENT DOCUMENTS 10,249,150 B1 * 4/2019 Blower ................. G07F 19/209
11,361,631 B2 * 6/2022 Kujat ................... G07D 11/225
11,676,460 B1 * 6/2023 Costello ................ G07F 19/209 235/7 R
2004/0035929 A1 * 2/2004 Okada .................... G06K 13/08 235/438
2005/0073584 A1 * 4/2005 Enright ................... G07F 19/20 348/150
2008/0136657 A1 6/2008 Clark et al.

FOREIGN PATENT DOCUMENTS

CN 113639789 11/2021
DE 102008023582 11/2009
JP 2010123091 6/2010

OTHER PUBLICATIONS

"European Application Serial No. 23219662.6, Extended European Search Report mailed Jun. 14, 2024", 9 pgs.

* cited by examiner

*Primary Examiner* — Thien M Le
*Assistant Examiner* — April A Taylor
(74) *Attorney, Agent, or Firm* — Schwegman Lundberg & Woessner, P.A.

(57) ABSTRACT

A cash trapping monitor apparatus is provided. The apparatus includes a monitor printed circuit board (PCB) interposed between a shutter assembly PCB and a dispenser/recycler PCB. The monitor PCB is connected/interfaced to a time-of-flight (TOF) sensor and an ultrasonic sensor both of which are situated behind a shutter blade in a media chute of a media handling device. Blade states reported by the shutter are changed by the monitor PCB before reporting to the dispenser/recycler PCB when distance measurements provided by the sensors indicate a cash trapping device is present in the chute, indicate that the shutter blade is missing, and/or indicate an original shutter blade was replaced with a different shutter blade.

20 Claims, 4 Drawing Sheets

CASH TRAP DETECTION

BACKGROUND

Media handling devices, such as automated teller machines (ATMs) have a variety of different modules one of which is a shutter module. Often, ATMs stage cash withdrawals behind a shutter blade of the shutter module until a customer withdraws their bank card used to perform a withdrawal transaction. Once the customer removes their card from a card module of the ATM, the shutter blade opens, and the cash is dispensed to the customer. When the card is not withdrawn after a configurable period of elapsed time, the ATM assumes the transaction was canceled and moves the pre-staged cash back into cash cassettes of the ATM; the customer's transaction is canceled, and no currency is debited from the card account associated with the transaction. In a few locations, when the transaction is canceled, the cash remains pre-staged until a next transaction at which point the cash is moved back to the cash cassettes.

Thieves have discovered a variety of mechanisms to exploit the pre-staged cash behind the shutter's blade. For example, the shutter blade can be broken off, the cash grabbed before the cash can be transported back to the cassettes. As another example, false shutter blade can be fitted in front of the actual shutter blade with glue or sticky material on a backside of the false shutter blade to stick pre-staged cash to the backside; a customer sees the frontside of the false shutter blade and thinks the withdrawal transaction failed because the false shutter blade never opens during the transaction; the thieves subsequently remove the false shutter blade and take the previous customer's cash stuck to the backside of the false shutter blade. In fact, there are a variety of additional scenarios used by thieves, such as replacing the shutter blade entirely with a false shutter blade, sticking the false shutter blade behind the actual shutter blade, etc.

SUMMARY

In various embodiments, a system, an apparatus, a transaction terminal, and a method for detecting cash trapping attacks are presented. In an embodiment, an apparatus is provided. The apparatus includes a monitor printed circuit board (PCB) interfaced to a time-of-flight (TOF) sensor and an ultrasonic sensor. The sensors provide measurements captured from emitted infrared (IR) light and emitted ultrasonic sound waves that reflect back from a backside of an expected shutter blade. When a false shutter blade is present or when the shutter blade is missing entirely based on the measurements, monitor firmware/software of the monitor PCB raises a security alert to a media handling device, such as a dispenser and/or recycler.

DETAILED DESCRIPTION

Typically, a shutter module/assembly includes a sensor to report to the ATM when the shutter blade is opened and closed. However, the sensor does not activate when the shutter blade is broken off. Additionally, a false shutter blade is not detected by the sensor such that the sensor continues to report opened and closed states for the existing shutter blade even through a false shutter blade remains closed. Still further, the sensor cannot distinguish between an expected shutter blade and a false shutter blade. As a result, and for any of the above-discussed cash trapping attacks, the shutter module continues to report incorrect shutter states to the ATM. Thus, thieves are taking advantage of these security holes in ATM technology.

As used herein, the phrases "shutter assembly," "shutter apparatus," and "shutter module" may be used interchangeably and synonymously. This refers to the electromechanical, hardware, and firmware/software of a shutter system for a media handling device. The shutter system is responsible for accepting and dispensing media, such as currency, for deposits and withdrawals through a slot located behind a shutter blade that is opened and closed to receive currency deposits and/or dispense currency.

The terms "media," "media item," "banknotes," "notes," "currency," "checks," and/or "cash" are used synonymously and interchangeably herein and below. These terms refer to the media being transported to, from, and within a deposit and dispense module of a media handling device during a media operation being processed. In an embodiment, the "media operations" include depositing a single note, depositing a bunch of notes, depositing a single check, depositing a bunch of checks, depositing a mixture of notes and checks within a single bunch, dispensing currency, dispensing a bunch of currency, and/or rejecting one or a plurality of media items during a deposit media operation.

In an embodiment, the media handling device is an integrated peripheral device of a transaction terminal. In an embodiment, the transaction terminal is an automated teller machine (ATM). In an embodiment, the transaction terminal is a point-of-sale (POS) terminal operated by a cashier or a teller during a media operation. In an embodiment, the transaction terminal is a self-service terminal (SST) with a consumer performing a self-service media operation; for example, a self-service checkout at a retail or grocery store, a cash withdrawal transaction, etc. The SST includes a deposit and dispense module or media handling device to receive/deposit notes and to dispense notes for purposes of receiving payment and providing change to the consumer for a self-service transaction.

Figure 1:
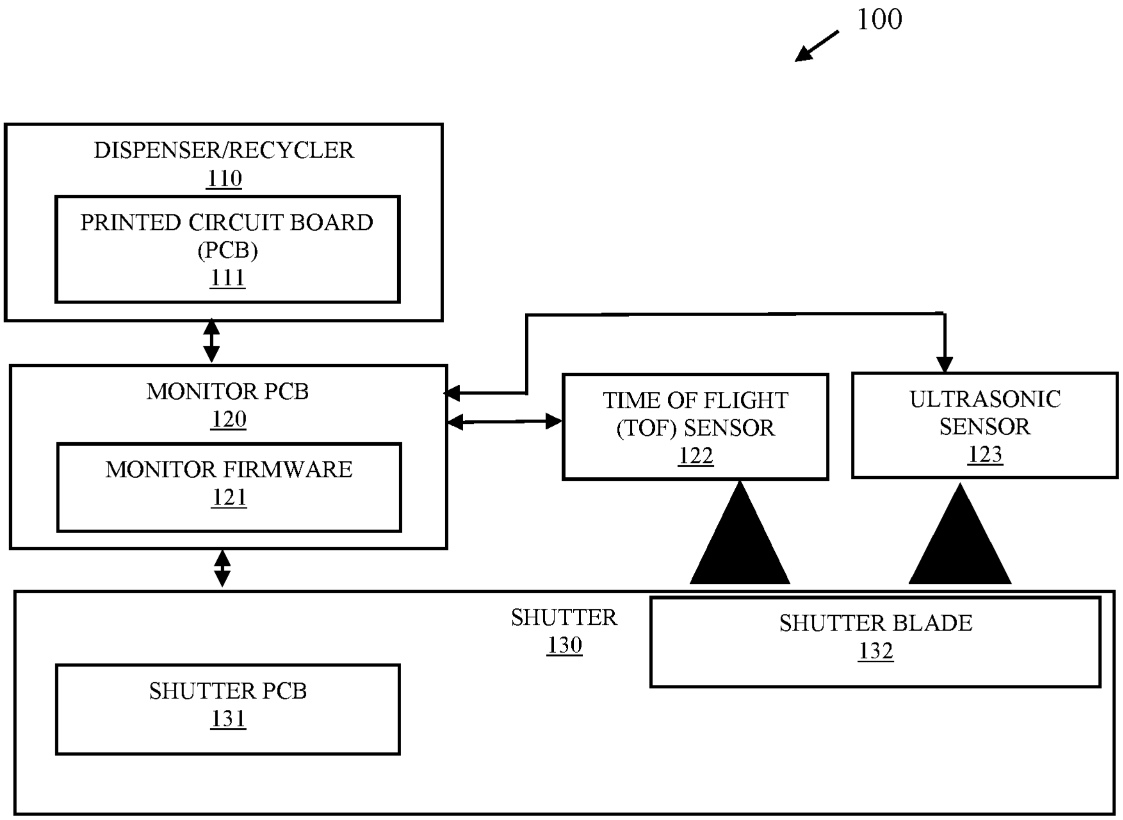
FIG. 1 is a diagram of a system for cash trap detection, according to an example embodiment.

FIG. 1 is a diagram of a system 100 for cash trap detection, according to an example embodiment. The system 100 is shown in simplified form with only those components/modules necessary for comprehending the teachings presented. Notably, more, or less components can exist without departing from the teachings herein.

System 100 includes a dispenser/recycler 100 (also referred to herein as "media handling device 100"), a monitor printed circuit board (PCB) and a shutter assembly/module/device 130. Dispenser/Recycler (herein after just "dispenser") includes a PCB 111, which includes at least one processor and a variety of firmware/software executed by the dispenser 110 to control the modules/components of the dispenser 111.

Monitor PCB 120 includes at least one processor and monitor firmware 121 executed by the at least one processor. Monitor PCB 120 also includes a time-of-flight (TOF)

sensor 122 and an ultrasonic sensor 123 connected or interfaced in parallel to the monitor PCB 121.

Shutter 130 includes a shutter PCB 131 and a shutter blade 132. Shutter PCB 131 further includes at least one processor and firmware/software executed by the processor to control opening and closing of the shutter blade 132 as instructed by firmware/software of the dispenser PCB 111 during a cash withdraw transaction.

Monitor PCB 120 relays states and commands between the dispense PCB 111 and the shutter PCB 131. Monitor firmware 121 when executed by the processor of the monitor PCB 121 also receives measurements provided by the TOF sensor 122 and the ultrasonic sensor 123. TOF sensor 122 provides distance measurements calculated from bouncing an IR light off of the back of shutter blade 132. Similarly, ultrasonic sensor 123 provides distance measurements calculated from bouncing ultrasonic sound waves off the back of shutter blade 132.

Monitor firmware 121 compares the distance measurements provided by the TOF sensor 122 and ultrasonic sensor 123 against known expected distance measurements between the corresponding sensors 122 and 123 and the back of an expected shutter blade 132 when the shutter PCB 131 is reporting to the dispenser PCB 111 that the shutter blade 132 is in a closed state. That is, based on the known material for the expected shutter blade 132 and based on the preconfigured distances between each of the sensors 122 and 123 and the back of the shutter blade 132, the monitor firmware 121 detects when the shutter blade 132 has been replaced, when the shutter blade 132 is open and should not be, when a foreign object is between the shutter blade 132 and the sensors 122 and 123 within the chute behind the shutter blade 132, and when a false shutter blade is present behind shutter blade 132 or in front of shutter blade 132. When at least one of the expected distance measurements is not what is expected, monitor firmware 121 raises a security alert to firmware/software of dispenser PCB 111. Monitor firmware 121 detects an open shutter blade state, a closed shutter blade state, and a cash trapping device detected state.

Additionally, monitor PCB 120 is interposed between dispenser PCB 121 and shutter PCB 131 and relays communications between dispenser PCB 111 and shutter PCB 131. The firmware/software of the dispenser PCB 111 and shutter PCB 131 do not require any modifications or changes. Monitor firmware 121 can inspect the shutter state reported by shutter PCB 131 and change that state before it is reported to dispenser PCB 111.

For example, when shutter PCB reports the shutter blade 132 is opened for a cash dispense media operation but monitor firmware 121 detects an object within the chute or an object past where the shutter blade 132 is expected to be, such as a false shutter blade, monitor firmware 121 reports a shutter blade state as being closed. This causes existing firmware/software of dispenser PCB 111 to terminate the media operation, retract the cash into a purge bin (i.e., for a dispenser 110) or back into media cassettes (i.e., for a recycler 110), shut down for any further media operations on dispenser 110, and raise a security alert to a transaction terminal of dispenser 110.

As another example, when shutter PCB reports the shutter blade 132 is in a closed state but monitor firmware 121 detects the shutter blade 132 is either opened or there is an unexpected object in the chute between the back of the expected shutter blade 132 and sensors 122 and 123, monitor firmware 121 changes the closed state to an open shutter blade state that is reported to dispenser PCB 111. This causes dispenser PCB 111 to shut down and raise a security alert to a transaction terminal of the dispenser 111.

The TOF sensor 122 standing alone has limitations with dark materials because the IR light does not reflect off dark materials. Similarly, ultrasonic sensor 123 has limitations but is excellent at detecting the materials placed in the chute based on known ultrasonic sound wave absorption rates of varied materials. The combination of both the TOF sensor 122 and the ultrasonic sensor 123 ensures that any foreign object placed in the chute behind the shutter blade 132, ensures that any foreign object placed on an outside of the shutter blade 132 outside the chute, and/or ensures that any broken and missing shutter blade 132 is detected.

In an embodiment, the monitor firmware 121 can be implemented within the shutter PCB 131. In this embodiment, TOF sensor 122 and ultrasonic sensor 123 are interfaced and connected directly to shutter PCB 131.

In an embodiment, firmware/software of dispenser PCB 111 is enhanced to receive a monitor state reported by monitor firmware 121. In this embodiment, the enhanced firmware/software of dispenser PCB 111 receives a shutter state from shutter PCB 131 through monitor PCB 120 and also receives and handles a monitor state reported by monitor firmware 121. Also, in this embodiment, there is no need for monitor firmware 121 to change, override, and/or modify any reported shutter state reported by firmware/software of shutter PCB 131.

Figure 2:
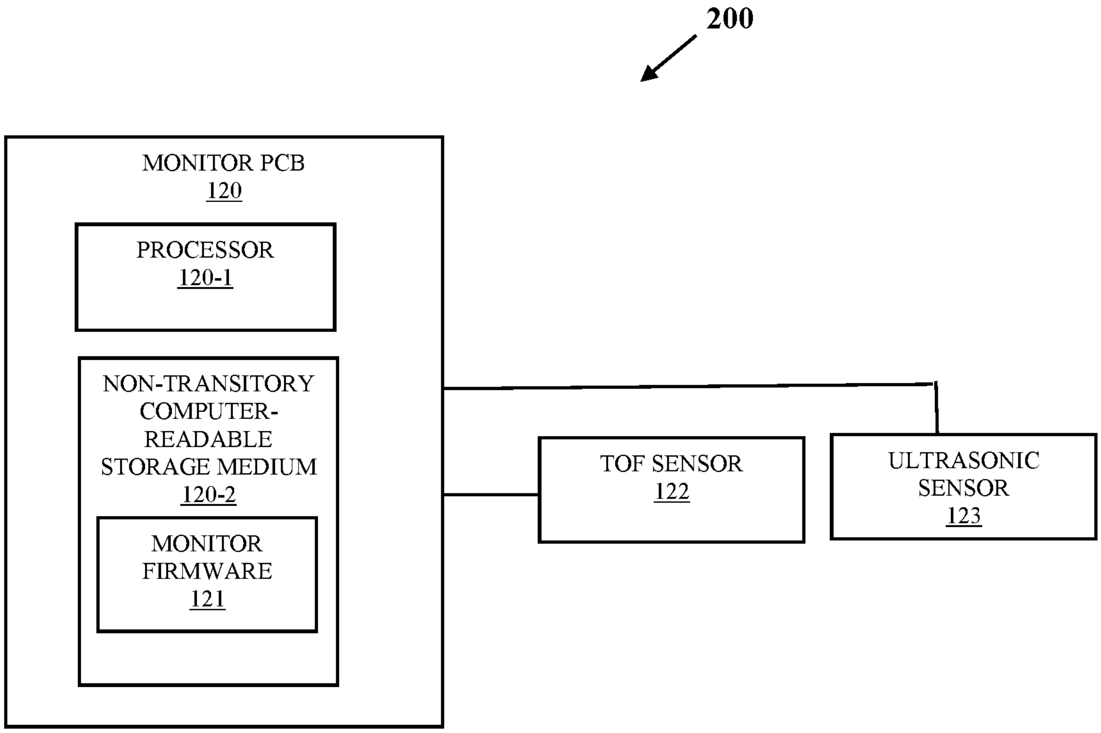
FIG. 2 is a diagram of a shutter monitor apparatus for cash trap detection, according to an example embodiment.

FIG. 2 is a diagram of a shutter monitor apparatus 200 for cash trap detection, according to an example embodiment. The apparatus 200 includes monitor PCB 120, TOF sensor 122, and ultrasonic sensor 123. Monitor PCB 120 includes a processor 120-1 and a non-transitory computer-readable storage medium (hereinafter just "medium") 120-2, which includes instructions for monitor firmware 121. When processor 120-1 executes the instructions, this causes processor 120-1 to perform operations discussed above with system 100 and herein for monitor firmware 121.

Monitor firmware 121 relays communications between dispenser 110 and shutter 130. Monitor firmware 121 also inspects shutter blade states reported by shutter 130. Monitor firmware 121 changes any given shutter blade state before reporting the corresponding state back to dispenser 110. Monitor firmware 121 changes the shutter blade states whenever distances reported by sensors 122 and 123 do not comport with predefined and preconfigured distances. Monitor firmware 121 changes shutter blade states whenever a cash trapping device is detected as being in the chute behind the shutter blade 132, whenever any cash trapping device is detected as being outside the chute in front of the shutter blade 132, whenever the shutter blade 132 is missing, and/or whenever the shutter blade 132 is replaced with a different and unexpected shutter blade.

Figure 3:
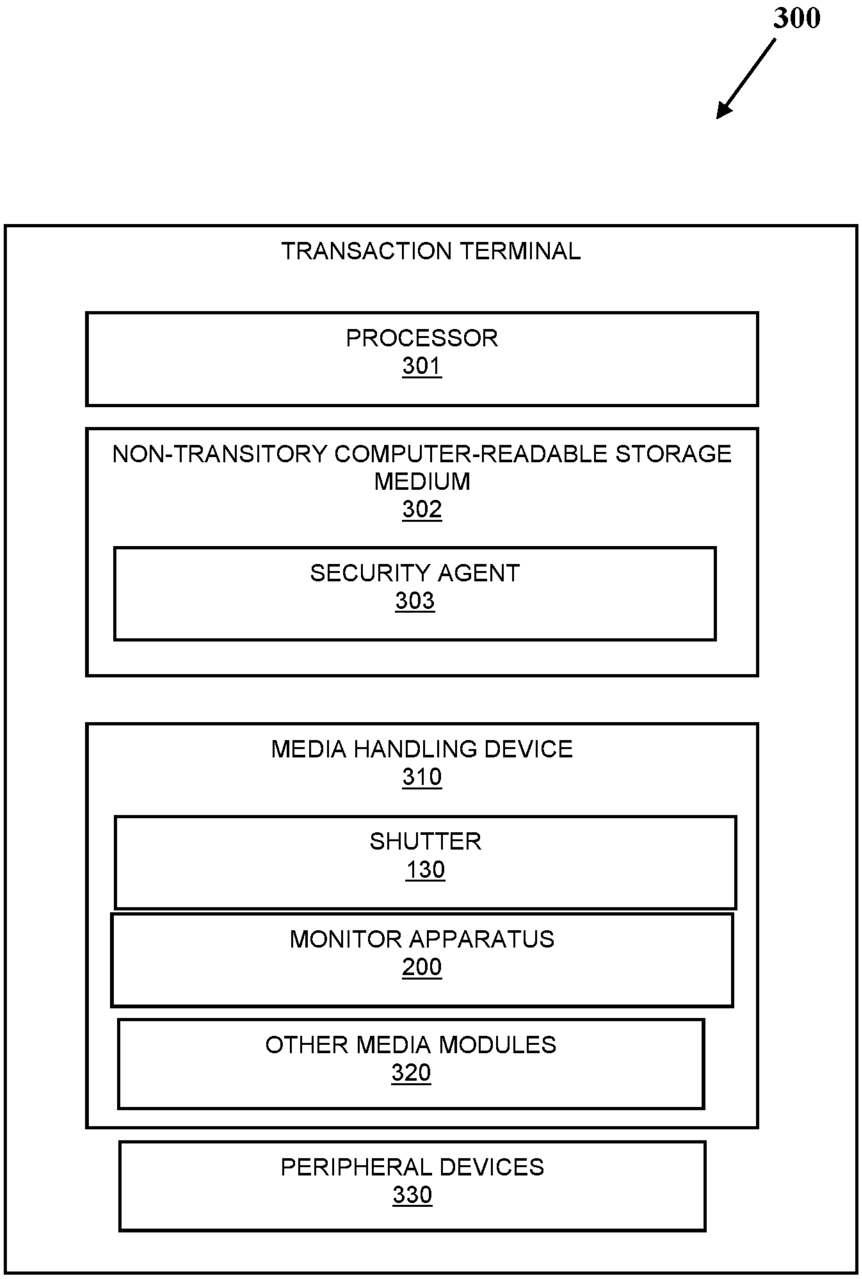
FIG. 3 is a diagram of a transaction terminal with a media handling device that includes the shutter monitor apparatus, according to an example embodiment.

FIG. 3 is a diagram of a transaction terminal 300 with a media handling device 310 that includes the shutter monitor apparatus 200, according to an example embodiment. Again, components of terminal 300 are shown in simplified form with just those components necessary for comprehending the teachings presented. Notably, terminal 300 can include more or less components from what is illustrated without departing from the teachings presented herein.

Transaction terminal 300 includes a processor 301; medium 302, which includes instructions for a security agent 303; a media handling device 310, and peripheral devices 330. The instructions when executed by processor 301 cause processor 301 to perform operations discussed herein with respect to security agent 303.

Media handling device 310 is an integrated peripheral device of terminal 300. Media handling device 310 includes shutter assembly/module/peripheral device 130, monitor apparatus 200, and other media handling modules 320. For example, the other media handling modules 320 can include, by way of example only, an upper media transport module, a media deskew module, a media verification module, a media diverter module, a lower media transport module, an escrow module, a recycler module, media cassettes modules, etc.

The peripheral devices 330 include, by way of example only, a card reader peripheral, a print receipt peripheral, a touchscreen peripheral, a contactless card reader peripheral (e.g., a near field communication (NFC) transceiver), a bioptic scanner peripheral, a handheld scanner peripheral, a vertical scanner peripheral, a horizontal scanner peripheral, a weigh scale peripheral, a bag scale peripheral, a combined scanner-and-scale peripheral, one or more camera peripherals, etc. Again, the media handling device 310 is also an integrated peripheral of terminal 300.

In an embodiment, media handling device 310 is dispenser 110. In an embodiment, media handling device 310 is recycler 110.

Media handling device 310 includes shutter 130 as discussed above with FIGS. 1 and 2. Media handling device 310 also includes monitor apparatus/device 200 as discussed above with FIGS. 1 and 2 with respect to monitor PCB 121, monitor firmware 121, TOF sensor 122, and ultrasonic sensor 123.

The monitor apparatus 200 includes monitor PCB 121, monitor firmware 121, TOF sensor 122, and ultrasonic sensor 123. TOF sensor 122 and ultrasonic sensor 123 are connected and interfaced to monitor PCB 121 in parallel. Sensors 122 and 123 are inserted into a chute of media handling device 310 behind a shutter blade 132 of shutter 130. Both sensors 122 and 123 are directed towards a back of shutter blade 132. Preconfigured distance measurements for when the shutter blade 132 is closed with no foreign objects are available as configuration parameters to monitor firmware 121. Communications between media handling device 310 and shutter 130 are passed through monitor apparatus 200. Monitor firmware 121 changes shutter blade states reported by shutter 130 when monitor firmware 121 detects a foreign object within the chute behind shutter blade 132 and detects a foreign object outside the chute in front of shutter blade 132. The foreign object can include a false shutter blade, a replaced or different than expected shutter blade 132, etc. Monitor firmware 121 can also detect and change any shutter blade state reported as closed when the shutter blade 132 is missing or open.

Security agent 303 receives a security alert from media handling device 310 when a shutter blade state is not what is expected based on a current state of media handling device 310. Upon receipt of the security alert, security agent 303 can dispatch personnel to inspect shutter blade 132 of shutter 130 and/or shut down media handling device 310 for any subsequent media operations at terminal 300. Media handling device 310 also retracts any pre-staged cash during a pending dispense media operation back into media cassettes (one type of other media modules 320 for a recycler 310) or into a purge bin (another type of other media modules 320 for a dispenser 310).

When security agent 303 is expecting a blade closed state such as when transaction terminal 300 is idle or when a current state of a transaction at terminal 300 does not correspond to an opening of blade 132 and security agent 303 receives a blade not closed event/state, which monitor firmware 121 changed based on detection of a cash trapping device, security agent 303 processes a workflow of security operations. For example, the workflow includes forcing a shutdown of media handling device 310, which in turn disables shutter 130 and cancels any current media operation being processed on the media handling device 310; forcing a shutdown of terminal 300; activating a camera peripheral device 330 to capture video of an area adjacent to the terminal 300; streaming the video to computer vision applications or systems for analysis; dispatching a service engineer to the transaction terminal 300; etc.

Similarly, when security agent 303 is expecting a blade open state such as when a dispense media operation dictates media handling device 310 issue an open shutter blade command to dispense pre-staged cash and security agent 303 receives a blade closed event/state, which monitor firmware 121 changed based on detection of a cash trapping device, security agent 303 processes a workflow of security operations. For example, the workflow includes instructing media handling device 310 to retract any pre-staged cash back into media cassettes or purge bin (assuming media handling device 310 has not already independently done this), forcing a shutdown of media handling device 310, activating a camera 330, streaming video to computer vision-based applications, dispatching personnel to the terminal 300, etc.

Figure 4:
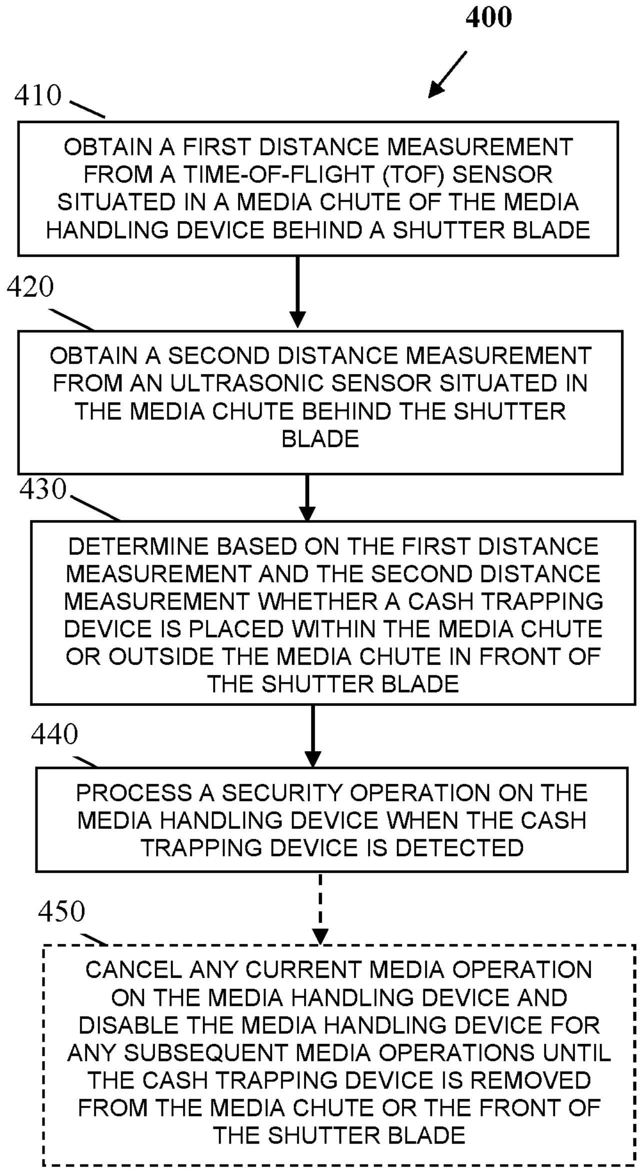
FIG. 4 is a diagram of a method for detecting cash trapping activities, according to an example embodiment.

FIG. 4 is a diagram of a method 400 for detecting cash trapping activities, according to an example embodiment. The software module(s) that implements the method 400 is referred to as "firmware." The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process the firmware. The firmware may or may not have access to one or more network connections during its processing. Any network connections used are wired, wireless, or a combination of wired and wireless.

In an embodiment, the device that executes the firmware is monitor PCB 120 of shutter apparatus 200. In an embodiment, the device that executes the firmware is dispenser PCB 111. In an embodiment, the device that executes the firmware is shutter PCB 131. In an embodiment, the device that executes the firmware is transaction terminal 300. In an embodiment, the firmware is a combination of both firmware and software executed by any combination of or by each of monitor PCB 120, dispenser PCB 111, shutter PCB 131, and/or transaction terminal 300.

At 410, the firmware obtains a first distance measure from a TOF sensor 122 situated in a media chute of a media handling device 110/310 behind a shutter blade 132. At 420, the firmware obtains a second distance measurement from an ultrasonic sensor 123 situated in the media chute behind the shutter blade 132.

At 430, the firmware determines based on the first distance measurement and the second distance measurement whether a cash trapping device is placed within the media chute or placed outside the chute on an outside of the shutter blade 132. In an embodiment, the firmware identifies a cash trapping device as being present if the shutter blade 132 is missing or broken off such that there is no shutter blade 132. In an embodiment, the firmware identifies a cash trapping device as being present if the shutter blade 132 is replaced with a different shutter blade, such as one that was 3D printed by a thief and made of different material than the original and expected shutter blade 132. In an embodiment, firmware identifies a cash trapping device as being present when a false shutter blade is placed behind of or in front of the expected and original shutter blade 132.

At 440, the firmware processes a security operation on the media handling device 110/310 when the cash trapping device is detected. In an embodiment, at 450, the firmware cancels any current media operation on the media handling device 110/310 and disables the media handling device 110/310 for any subsequent media operations until the cash trapping device is removed from the media chute.

It should be appreciated that where firmware/software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

The above description is illustrative, and not restrictive. Other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A monitor apparatus for a media handling device, comprising:

a printed circuit board (PCB) comprising a processor and firmware executed by the processor;

a time-of-flight (TOF) sensor interfaced to the PCB; and an ultrasonic sensor interfaced to the PCB; and the firmware when executed by the processor cause the processor to perform operations comprising:

detecting when a cash trapping device is inserted within a media chute of the media handling device behind a shutter blade or detecting when the cash trapping device is outside the media chute in front of the shutter blade based on distance measurements provided by the TOF sensor and the ultrasonic sensor;

comparing the distance measurements provided by the TOF sensor and the ultrasonic sensor against known expected distance measurements between corresponding sensors and a back of an expected shutter blade when the shutter blade is in a closed state; and causing a security alert to be raised to the media handling device when the cash trapping device is detected.

2. The monitor apparatus of claim 1, wherein the TOF sensor and the ultrasonic sensor are situated within the media chute behind the shutter blade.

3. The monitor apparatus of claim 1, wherein the TOF sensor and the ultrasonic sensor are connected in parallel to the PCB.

4. The monitor apparatus of claim 1, wherein the PCB is interposed between a media handling device PCB for the media handling device and a shutter PCB for a shutter assembly of the media handling device, wherein the shutter assembly includes the shutter blade.

5. The monitor apparatus of claim 4, wherein the firmware when executed by the processor further cause the processor to perform additional operations comprising:

relaying instructions originating from the media handling device PCB to the shutter PCB; and relaying shutter blade states reported from the shutter PCB to the media handling device PCB.

6. The monitor apparatus of claim 5, wherein the firmware associated with the relaying the shutter blade states further include overriding and modifying the shutter blade states reported from the shutter PCB when the cash trapping device is detected and providing modified shutter blade states to the media handling device PCB to cause the security alert.

7. The monitor apparatus of claim 1, wherein the firmware associated with the detecting the cash trapping device further includes detecting when the shutter blade is opened, and a shutter blade state reported from a shutter assembly is the closed state and determining the cash trapping device to be present based on the shutter blade being opened or missing from the shutter assembly.

8. The monitor apparatus of claim 1, wherein the firmware associated with the detecting the cash trapping device further includes detecting when an original shutter blade is replaced with a different shutter blade and determining the cash trapping device to be present based on the different shutter blade.

9. The monitor apparatus of claim 1, wherein the firmware associated with the causing the security alert further includes changing and overriding a shutter blade state reported by a shutter assembly of the media handling device when the cash trapping device is detected to cause the security alert.

10. The monitor apparatus of claim 1, wherein the firmware associated with the causing further includes causing, based on the security alert, a media dispense operation to cancel on the media handling device and pre-staged cash to be retracted from the media chute back into one or more media cassettes or a purge bin of the media handling device.

11. A transaction terminal, comprising:

a media handling device comprising a shutter assembly and a monitor apparatus;

the shutter assembly comprising a shutter blade;

the monitor apparatus comprising:

a processor, a time-of-flight (TOF) sensor; and an ultrasonic sensor;

wherein the processor configured to use distance measurements provided by the TOF sensor and the ultrasonic sensor to detect when a cash trapping device is present within a media chute behind the shutter blade of the shutter assembly, to detect when the cash trapping device is outside the media chute in front of the shutter blade, to compare the distance measurements provided by the TOF sensor and the ultrasonic sensor against known expected distance measurements between corresponding sensors and a back of an expected shutter blade when the shutter blade is in a closed state, and to cause a security alert to be processed by the media handling device and the transaction terminal.

12. The transaction terminal of claim 11, wherein the security alert when processed causes pre-staged cash within the media chute for a cash dispense operation to be urged into one or more media cassettes or a purge bin of the media handling device and further causes the cash dispense operation to cancel on the transaction terminal.

13. The transaction terminal of claim 12, wherein the security alert when processed causes the transaction terminal to dispatch a service engineer to the transaction terminal for inspection of the shutter blade of the shutter assembly and for inspection of the media chute.

14. The transaction terminal of claim 11, wherein the monitor apparatus further includes a monitor printed circuit board (PCB), wherein the monitor PCB includes the processor, a first connection between the monitor PCB and the TOF sensor, and a second connection between the monitor PCB and the ultrasonic sensor.

15. The transaction terminal of claim 14, wherein the first connection and the second connection are parallel connections to the monitor PCB.

16. The transaction terminal of claim 15, wherein the media handling device further includes a media handing device PCB, and the shutter assembly further includes a shutter PCB.

17. The transaction terminal of claim 16, wherein the monitor PCB is interposed between the media handling device PCB and the shutter PCB, wherein the monitor PCB relays instructions originating from the media handling device PCB to the shutter PCB, and relays shutter blade states originating from the shutter PCB to the media handling device PCB, and overrides certain shutter blade states reported by the shutter PCB before providing to the media handling device PCB when the cash trapping device is detected within the media chute or when the cash trapping device is detected outside the media chute in front of the shutter blade to cause the security alert to be processed on the media handling device and the transaction terminal.

18. The transaction terminal of claim 11, wherein the transaction terminal is an automated teller machine, a point-of-sale terminal, or a self-service terminal.

19. A method of operating a media handling device for detecting cash trapping attacks, comprising:

obtaining a first distance measurement from a time-of-flight (TOF) sensor situated in a media chute of the media handling device behind a shutter blade;

obtaining a second distance measurement from an ultrasonic sensor situated in the media chute behind the shutter blade;

determining based on the first distance measurement and the second distance measurement whether a cash trapping device is placed within the media chute behind the shutter blade or whether the cash trapping device is placed outside the media chute in front of the shutter blade;

comparing the first distance measurement and the second distance measurement against known expected distance measurements between corresponding sensors and a back of an expected shutter blade when the shutter blade is in a closed state; and processing a security operation on the media handling device when the cash trapping device is detected.

20. The method of claim 19, wherein processing further includes cancelling any current media operation on the media handling device and disabling the media handling device for any subsequent media operations until the cash trapping device is removed from the media chute or the front of the shutter blade.

* * * * *